Sept. 11, 1934.   C. JOHNSON   1,972,853
POWER AMPLIFYING POSITIONING DEVICE
Filed Feb. 12, 1931
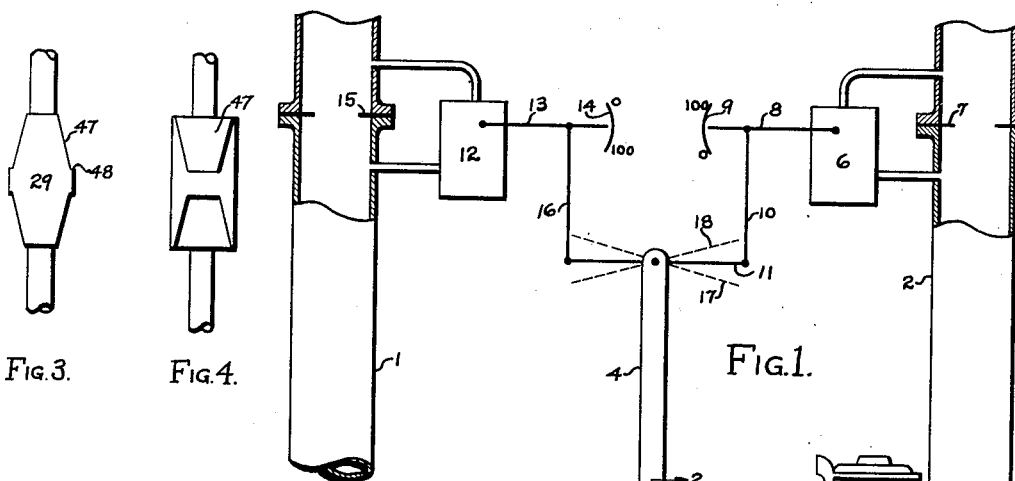
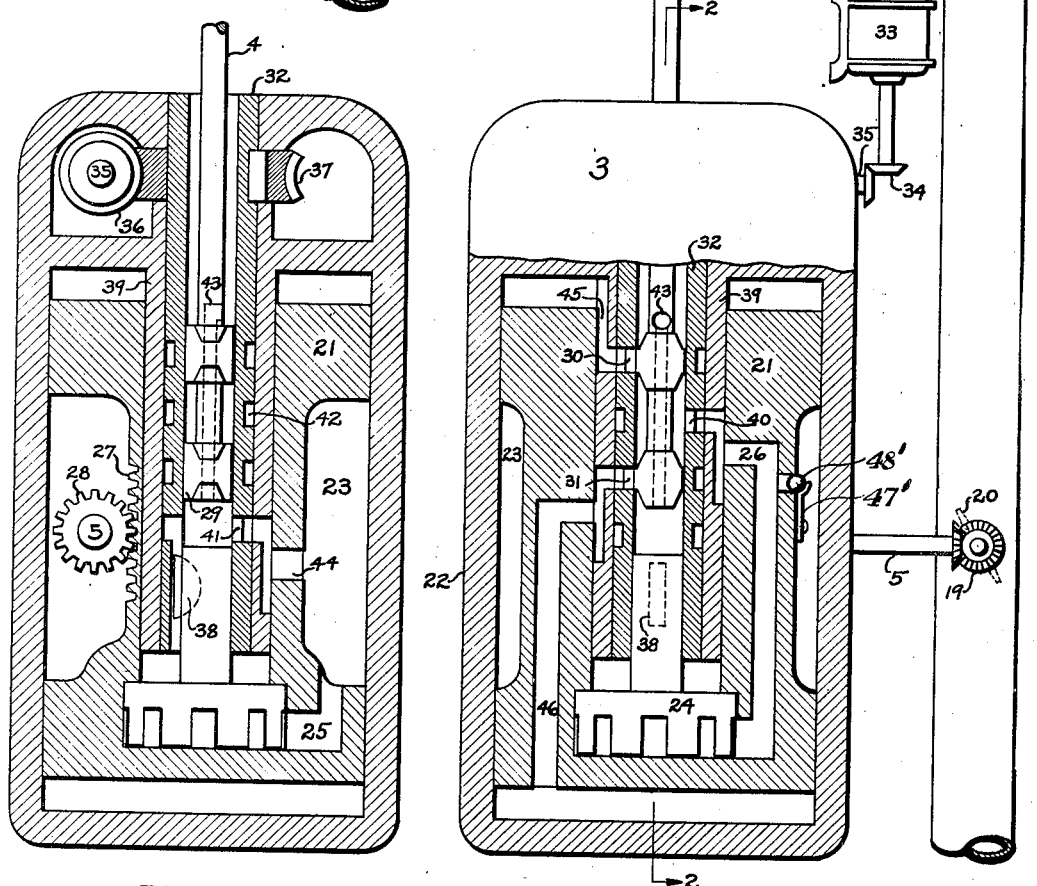
INVENTOR
Clarence Johnson.
BY
ATTORNEY Patented Sept. 11, 1934

1,972,853

UNITED STATES PATENT OFFICE 1,972,853

POWER AMPLIFYING POSITIONING DEVICE

Clarence Johnson, Cleveland, Ohio, assignor to Bailey Meter Company, a corporation of Delaware Application February 12, 1931, Serial No. 515,325

5 Claims. (Cl. 60—52)

This invention relates in general to devices wherein the positioning of a member by a relatively weaker control force results in the positioning of another member by an amplified or relatively greater force, to accomplish a useful purpose. Such devices are known as "torque or power amplifiers", and the movement of the second member may bear a functional relation to the movement of the first member, or may be in relation to the amount, direction, and speed of departure of the first member from a given position; but in any event, the second member is caused to move or to be positioned as the result of a change in position of the first member, and with a force relatively greater than the force imparted to the first member.

The first member may be positioned or caused to depart from a given position through various causes; for example, by variations in pressure, differential pressure, temperature, ratio of fluid flow, or in fact any variable factor or relation whose force is desirably magnified to position a second member requiring a relatively greater force for such positioning. The second member so positioned may move an indicator, or can be used to move a damper or valve, or desirable regulable mechanism whose movement may or may not result in a change in value of the factor or relation which caused the initial movement of the first member.

My invention relates particularly to those systems constituting what is known in the art as "floating control", and I propose to illustrate and describe an embodiment in connection with the maintenance of a predetermined ratio of fluid flows. By "floating control" I mean a control system wherein, for example, a member is positioned or caused to depart from a predetermined position through the variation of a factor or relation from a predetermined value, such departure resulting in a correction or compensation of the apparatus under control to return the factor or relation to its original value and correspondingly the member to its predetermined position. This is distinguished from what is known as a "geared control" where the member has a definite position corresponding to each value of a factor and does not necessarily return to a predetermined position when the compensation has been applied to the apparatus.

The primary object of my invention is to provide such a device for amplifying the power imparted to the first member resulting in movement thereof, so that a second member movable or positioned with the amplified force accomplishes a compensation, or controls a compensation, of the apparatus under control, to return the factor or relation to the predetermined value, and thereby the first member to its predetermined position.

Another object is to provide such an arrangement that the amount, direction and rate of motion of the second member will be in desired relation to the movement of the first member.

A further object is that the total motion of the second member over a period of time will bear a desired mathematical relation to the movement of the first member.

With these and further objects in view, I will now describe a preferred embodiment of my invention.

In the drawing:

Fig. 1 is an arrangement, partly diagrammatic and partly in sectional elevation, of an embodiment of the invention.

Fig. 2 is a sectional elevation of the power amplifying positioning device of Fig. 1, along the line 2—2 in the direction of the arrows.

Figs. 3 and 4 are enlarged details of a part of a pilot illustrated in Figs. 1 and 2.

Referring first to Fig. 1, I have illustrated an arrangement wherein the rate of fluid flow through the conduits 1 and 2 is desirably maintained in predetermined ratio through the control of the rate of flow of fluid through the conduit 2. A power amplifying positioning device embodying my invention is indicated generally at 3, having a first member 4, positioned in accordance with variations in ratio of the rates of flow of the two fluids, and whose departure from a predetermined position results in the positioning of a second member 5 with an amplified force in desirable amount, direction and rate for control of one of the fluids. For positioning the member 4 relative to a predetermined position, I have shown diagrammatically a differential floating linkage in turn positioned by and in accordance with changes in the ratio of fluid flow through the two conduits.

A rate-of-flow meter 6 is connected to be responsive to a pressure differential bearing a known relation to the rate of flow of the fluid in the conduit 2 past an orifice obstruction 7. An arm 8, shown diagrammatically as extending from the flow meter 6, is positioned by said flow meter incrementally directly proportional to variations in the rate of flow, and arranged so that the movable end cooperates with an index 9 graduated conventionally from 0 to 100% of flow. Angular motion of the arm 8 around its pivoted end at the flow meter 6 results in the raising or lowering of a link 10 and the connected end of a floating bar 11.

Similarly, a rate-of-flow meter 12 positions an arm 13 relative to an index 14, responsive to variations in a pressure differential existing with fluid flow across an orifice obstruction 15 in the conduit 1. A link 16 depends from and is positioned by the arm 13, and is connected at its lower extremity pivotally to the floating bar 11, which at some point intermediate its ends is pivotally connected to the member 4.

In Fig. 1 the flow meters are shown as responsive to a rate of flow in each of the conduits 1 and 2 of approximately 50% of maximum, and of a ratio between the two rates of flow of unity, wherein the floating bar 11 lies horizontal and the member 4 is at a predetermined neutral position. Should the rate of flow through the two conduits be decreased to zero, the bar 11 will assume the position shown by the dotted line 17, while should the flows through the two conduits each increase to 100%, the bar 11 will assume the position shown by the dotted line 18; but in either event or for any intermediate rate of flow, so long as the desired proportionality exists between the rates of flow through the two conduits, the member 4 remains in its predetermined position.

If, however, the flow through the conduit 1 alone would increase, then the link 16 would be lowered, while the link 10 remains in its previous position, and the result would be a departure of the member 4 from its predetermined position. It is an object of my invention that upon such a positioning or departing of the member 4 from its predetermined position, a positioning of the member 5 will result, through the medium of the device 3, in desirable amount, direction and rate.

I have illustrated the member 5 as being connected through the gearing 19 to position a damper 20 in the conduit 2 for control of the rate of fluid flow therethrough, to the end that a desired proportionality be maintained between the rate of fluid flow through the conduit 1 and the conduit 2.

The construction and arrangement of parts of the device 3 for accomplishing the desired motion of the member 5 following a departure of the member 4 from its predetermined position will now be described. Certain features of the construction and arrangement of the device 3 embodying the concentric arrangement of the pilot valve, the hydraulic pump and the power piston, and wherein the hydraulic pump is moved axially with the power piston, are disclosed and claimed in Patent No. 1,922,834 granted on a copending application of Joseph C. Albright, Serial No. 498,374 filed November 26, 1930. Certain construction and operating features of the pilot valve used in the device 3 are disclosed and claimed in Patent No. 1,967,851 granted on a copending application of James M. Wilson, Serial No. 515,276 filed February 12, 1931. Reference may be made to these applications for description in greater detail of the features not claimed herein.

A piston 21 is shown in approximately its mid-travel position relative to a cylinder 22 forming a part of the casing of the assembly 3. The piston is of a shape, intermediate its ends, wherein its external contour cooperating with the interior wall of the cylinder 22 forms a chamber 23 for the storage of hydraulic fluid, in this case, oil.

Located within the piston 21 and carried axially thereby is an oil pump 24 drawing oil from the storage space 23 through the passage 25 and discharging oil when needed through the passage 26.

The piston 21 is capable of axial positioning through the application to the cylinder, at one end or the other of the piston, of oil under pressure, and a simultaneous drainage from the opposite end. The axial positioning results, through the rack 27 and gear 28, in a positioning of the member 5 and of the damper 20, so that for every position of the piston 21 in the cylinder 22 there is a corresponding position of the damper 20 relative to the conduit 2.

To cause an application of oil under pressure to one end of the piston and a drainage from the cylinder at the other end, I provide a pilot valve assembly for controlling oil under pressure, available through the passage 26 from the pump 24. The member 4 carries at its lower end two lands 29 shown to larger scale in more detail in Figs. 3 and 4. These lands are cylindrical enlargements of the member 4, spaced apart in desirable relation with the ports 30 and 31 of a sleeve member 32, forming a pilot casing. The sleeve member 32 is desirably rotated by a motor 33 through the intermediary of gearing 34, the shaft 35 extending external of the assembly, the worm 36 and the worm wheel 37, the latter keyed to the sleeve member 32 in a manner providing for rotation of said member without the possibility of axial movement.

Rotation of the sleeve member 32 allows intermittent passage of oil from the pump to one end or the other of the cylinder for a purpose, to be explained hereinafter; as well as keeping free for axial positioning the pilot valve 4 relative to the casing 32, and at the same time providing motive means for the pump 24 through a spline 38 by means of which the pump is allowed to move axially relative to the sleeve member 32 while rotating.

Interposed between the sleeve member 32 and the piston 21 is a tubular projection 39 of the upper head of the cylinder 22 forming a barrier wall between the sleeve member and the piston, and incorporating certain necessary passages for the transmittal of the oil.

The ports 30 and 31, as well as similar port openings 40 and 41, preferably comprise cylindrically bored holes through the wall of the sleeve member 32, radial to the axis of the assembly and axially spaced along the sleeve member 32 to extend through the wall of the member 32 in coincidence with respective annular channels 42 spaced along the outer wall of the sleeve 32; the ports 30, 31, 40 and 41 communicating between the interior of the sleeve member 32 and the annular chambers 42.

It will be seen that by means of the passage 26 and the port 40, oil under pressure from the pump is always available at the interior of the pilot casing 32 between the lands 29. A drain to the reservoir 23 is provided from above the upper land 29 by a passage 43 and from below the pilot valve through the port 41 and the passage 44.

The passage 45 allows the admission of oil from the interior of the pilot casing 32 to the cylinder 22 above the piston 21 when the upper land 29 moves upward relative to the port 30. The passage 46 allows oil to be applied below the piston when the pilot valve moves downward so that the lower land 29 is out of alignment with the port 31. In either case, oil under pressure being available within the pilot casing 32 between the lands 29 and drainage from the end of the cylinder opposite that to which oil pressure is applied passing through the other port and to drain, as explained before, through the passage 44 to the reservoir 23.

So long as the lands of the pilot valve 4 are aligned with the ports of the sleeve 32, no hydraulic fluid passes through the ports from the pump rotor 24, and assuming that the rotor is in continual rotation, then pressure developed thereby is relieved from the passage 26 to the reservoir 23 through a small relief valve 48', spring backed by a spring 47'.

Thus it will be seen that if the member 4 is positioned upwardly or downwardly from its predetermined position, wherein the lands 29 coincide with the ports 30 and 31, then if the movement of the positioning is upward, the result will be a movement of the piston 21 in a downward direction; and if the movement of the pilot valve is downward, then the piston will move upwardly.

The amount and rate of said movement as well as the total change in position of the piston over a period of time is dependent upon the amount and time of displacement of the member 4 from its predetermined position, as well as upon the shape of the pilot lands 29.

The preferred design of the lands 29 is shown in detail in Figs. 3 and 4, wherein the cylindrical enlargement of the member 4 has one or more beveled portions both above and below a central cylindrical portion, the length of which corresponds to the length of a port such as 30. In the drawing I have shown two beveled portions above and two below this central part of each land. These portions indicated at 47 in Figs. 3 and 4 form a sharp shoulder, indicated at 48, with the central cylindrical portion of the land, and incline toward the axis as the end of the land is approached.

As the member 4 is moved axially relative to the ports with which the lands 29 are aligned, the aligning cylindrical portion of the land moves out of alignment and immediately a passage of oil is allowed through the port, of an amount depending upon the amount of axial movement of the land relative to the port, as well as upon the depth of the shoulder 48. Further axial movement in the same direction makes available for passage of oil from the interior of the pilot casing 32 through the port a greater space, proportionate not only to the amount of axial movement, but to the inclination toward the axis of the surface 47 as well as the varying width of the surface 47 presented opposite the port.

It will further be seen that an opening for the passage of oil through the port is available only as each of the surfaces 47 is presented opposite the port in question, and as in the specific construction illustrated, there are two of these surfaces in a complete circumference or revolution of the rotated member 32, then twice per revolution will an impulse of energy in the form of oil under pressure be allowed to pass through the port. The action is thus intermittent, and the number of impulses of energy allowed to pass through the passages to one end or the other of the cylinder beyond the piston will depend upon the number of revolutions per unit of time of the sleeve 32, as well as the number of surfaces 47 around the cylindrical land 29.

The specific shape of the pilot land 29 results in a throttling of oil as the land axially approaches a shut-off position with the port, and also varies the percentage of each revolution during which oil can flow through the port, while the depth of the shoulder 48 and the inclination of the surface 47 help determine the amount of oil passed per increment or per presentation of a surface 47 opposite a port. The intermittent action developed through the rotation of either the pilot valve or the pilot casing relative to the other, and the construction of the land 29 tends to prevent overtravel and hunting of the piston 21 and allow the effect of motion of the piston 21 to react upon the fluid stream in the conduit 2 and back upon the position of the member 4, tending to return it to neutral without hunting or overtraveling.

It will be seen that by the construction of the pilot land described, I have a device not only amplifying a relatively weaker control force which may be applied to position the member 4 to provide a relatively stronger or amplified force positioning the member 5 to accomplish a useful purpose, but at the same time the motion of the member 5 in either direction from a position of rest is proportional in amount to a time integration of the amount of departure of the member 4 from a predetermined position; in direction depending upon the direction of departure of the member 4 from the predetermined position; and in rate proportional to the amount of departure of the member 4 from the predetermined position. The rate of rotation of the member 5 is further dependent upon the shape of the pilot land as above described. The total motion of the member 5 over a period of time, from a given position is in amount and direction the algebraic sum of the individual movements of the member 5, each of which movements is in amount proportional to a time integration of the amount of departure of the member 4 from the predetermined or neutral position.

I have illustrated and described a preferred arrangement of parts, but my invention is not to be limited thereby, it only being essential that a source of hydraulic fluid be available to be controlled by the pilot valve in a manner to result in the advantages I gain.

I may provide other forms of fluid operating or fluid actuating means, or other ways of rotating or keeping free for axial positioning the pilot valve so long as I tend to keep at a minimum resistance of some of the parts relative to others, and to give the intermittent action described, of having certain portions of the pilot valve come opposite port openings periodically.

It will be seen that I might have more or less than the two surfaces 47 which I have illustrated, both above and below the central portions of the lands. For example, if I had three in place of two, then I would get three increments of oil pressure applied to the ports on each revolution of the sleeve member 32; whereas if I had only one, then I would get only one increment per revolution. Furthermore, the inclination toward the axis of the beveled portion 47 may be changed, it being only necessary that this be inclined rather than parallel to the axis, so that the surface 47 as viewed in Fig. 4 forms, as shown, a portion of a triangle rather than a square or parallelogram. It is also immaterial as to just the exact depth of the shoulder 48, except that I desire that this be a shoulder rather than having the surface 47 extend tangential to the cylindrical portion.

Having thus illustrated and described certain preferred embodiments of my invention, I desire it to be understood that I am not limited other than as covered by the claims in view of prior art.

What I claim as new and desire to secure by Letters Patent of the United States, is:

1. In a power amplifying mechanism, in combination, an axially movable pilot valve capable of being positioned by a relatively weaker control force, a rotatable sleeve surrounding said pilot valve and having ports for the passage of hydraulic fluid, rotating means for said sleeve, an axially movable fluid pump fastened to said sleeve and operated thereby, an axially movable piston concentric with and surrounding said sleeve and pump and cooperating in a cylinder, fluid passages in said piston, said pilot valve arranged upon axial positioning to control passage of hydraulic fluid from said pump to said cylinder at one end or the other of said piston to cause a movement thereof, said pilot valve adapted to vary the rate of flow of hydraulic fluid from said pump to said cylinder with the amount of departure of the pilot valve axially from a predetermined position, a member positioned by said piston externally of said cylinder to provide an amplified force, the wall of said piston intermediate its ends defining with the wall of said cylinder a fluid storage space, and means for periodically allowing passage of hydraulic fluid through said ports when said pilot valve is in other than a predetermined axial position.

2. In a power amplifying mechanism, in combination, an axially movable pilot valve capable of being positioned by a relatively weaker control force, a rotatable but not axially movable sleeve surrounding said pilot valve and having ports for the passage of hydraulic fluid, rotating means for said sleeve, an axially movable fluid pump rotatable by but axially movable relative to said sleeve, an axially movable piston concentric with and surrounding said sleeve and pump and cooperating in a cylinder, fluid passages in said piston, said pilot valve arranged upon axial positioning to control passage of hydraulic fluid from said pump to said cylinder at one end or the other of said piston to cause a movement thereof, said pilot valve adapted to vary the rate of flow of hydraulic fluid from said pump to said cylinder with the amount of departure of the pilot valve axially from a predetermined position, a member positioned by said piston externally of said cylinder to provide an amplified force, the wall of said piston intermediate its ends defining with the wall of said cylinder a fluid storage space, and means for periodically allowing the passage of hydraulic fluid through said ports when said pilot valve is in other than a predetermined axial position.

3. In a power amplifying mechanism, in combination, a source of hydraulic fluid, a cylinder, a pilot valve for controlling the passage of hydraulic fluid to the cylinder, a piston positioned in the cylinder by the hydraulic fluid, the piston surrounding the pilot valve and capable of being positioned axially relative to the pilot, a rotatable but not axially movable sleeve surrounding the pilot valve, means for rotating said sleeve relative to said pilot valve, said pilot valve shaped to periodically allow the passage of hydraulic fluid to the cylinder when in other than a predetermined position when said sleeve is rotated relative to said pilot valve.

4. In a power amplifying mechanism, in combination, a source of hydraulic fluid, a cylinder, a pilot valve for controlling the passage of hydraulic fluid to the cylinder, a piston positioned in the cylinder by the hydraulic fluid, the piston surrounding the pilot valve and capable of being positioned axially relative to the pilot valve, a rotatable but not axially movable sleeve surrounding the pilot valve, means for rotating said sleeve relative to said pilot valve, said pilot valve shaped to periodically allow the passage of hydraulic fluid to the cylinder when in other than a predetermined position and in amount proportional to the amount of departure of said pilot from the predetermined position when said sleeve is rotated relative to said pilot valve.

5. In a power amplifying mechanism, in combination, a source of hydraulic fluid, a cylinder, a pilot valve for controlling the passage of hydraulic fluid to the cylinder, a piston positioned in the cylinder by the hydraulic fluid, the piston surrounding the pilot valve and capable of being positioned axially relative to the pilot valve, and a sleeve surrounding the pilot valve, not axially movable but rotatable relative to said pilot valve.

CLARENCE JOHNSON.